(12) United States Patent
Huber et al.

(10) Patent No.: US 6,390,896 B1
(45) Date of Patent: May 21, 2002

(54) METHOD AND DEVICE FOR CUTTING A MULTIPLICITY OF DISKS FROM A HARD BRITTLE WORKPIECE

(75) Inventors: Anton Huber; Joachim Junge, both of Burghausen; Jörg Moser, Burgkirchen, all of (DE)

(73) Assignee: Wacker Siltronic Gesellschaft für Halbleitermaterialien AG, Burghausen (DE)

( * ) Notice: Subject to any disclaimer, the term of this patent is extended or adjusted under 35 U.S.C. 154(b) by 0 days.

(21) Appl. No.: 09/387,454

(22) Filed: Sep. 1, 1999

(30) Foreign Application Priority Data

Sep. 10, 1998 (DE) .......................................... 198 41 492

(51) Int. Cl.⁷ ................................................ B24B 1/00
(52) U.S. Cl. ................................ 451/59; 451/5; 451/18; 451/9; 125/21; 125/12; 125/14; 125/16.02
(58) Field of Search ............................ 425/21, 12, 14, 425/16.02; 451/5, 18, 9; 125/21, 12, 14, 16.02

(56) References Cited

U.S. PATENT DOCUMENTS

| 4,052,584 A | 10/1977 | Reznicek | |
| 5,201,305 A | * 4/1993 | Takeuchi | 125/21 |
| 5,269,285 A | * 12/1993 | Toyama et al. | 125/21 |
| 5,827,113 A | 10/1998 | Okuno et al. | |
| 5,829,424 A | * 11/1998 | Hauser | 125/16.01 |
| 6,006,737 A | * 12/1999 | Hayashi et al. | 125/21 |
| 6,006,738 A | * 12/1999 | Itoh et al. | 125/21 |
| 6,065,461 A | * 5/2000 | Asakawa et al. | 125/21 |
| 6,070,570 A | * 6/2000 | Ueoka et al. | 125/22 |

FOREIGN PATENT DOCUMENTS

| DE | 27 18 156 | 11/1977 |
| DE | 196 38 991 | 5/1997 |
| DE | 196 36 055 | 3/1998 |
| EP | 0767036 | 4/1997 |
| EP | 0798405 | 10/1997 |

OTHER PUBLICATIONS

The English Derwent Abstract AN 1998–169813 [16] corresp. to DE 196 36 055 is enclosed.
Database WPI, Section PQ, Week 9940, Derwent Publ. Ltd. Class P61, AN 99–472770 corresp. to JP11198020A.
Patent Abstracts of Japan, vol. 1998, No. 10, Aug. 8–31, 1998, corresp. to JP 10 138 114A.

* cited by examiner

Primary Examiner—Joseph J. Hail, III
Assistant Examiner—Shantese McDonald
(74) Attorney, Agent, or Firm—Collard & Roe, P.C.

(57) ABSTRACT

A method for cutting a multiplicity of disks from a hard brittle workpiece is by moving the workpiece at a defined feed rate through a wire web of a wire saw. In the method, the wire web is formed by a sawing wire which moves in a reciprocating manner and is covered with bonded abrasive grain. A cooling liquid is provided beneath the wire web, in which cooling liquid the sawing wire of the wire web is immersed when cutting off the disks. Also provided is a wire saw which is suitable for carrying out the method.

8 Claims, 2 Drawing Sheets

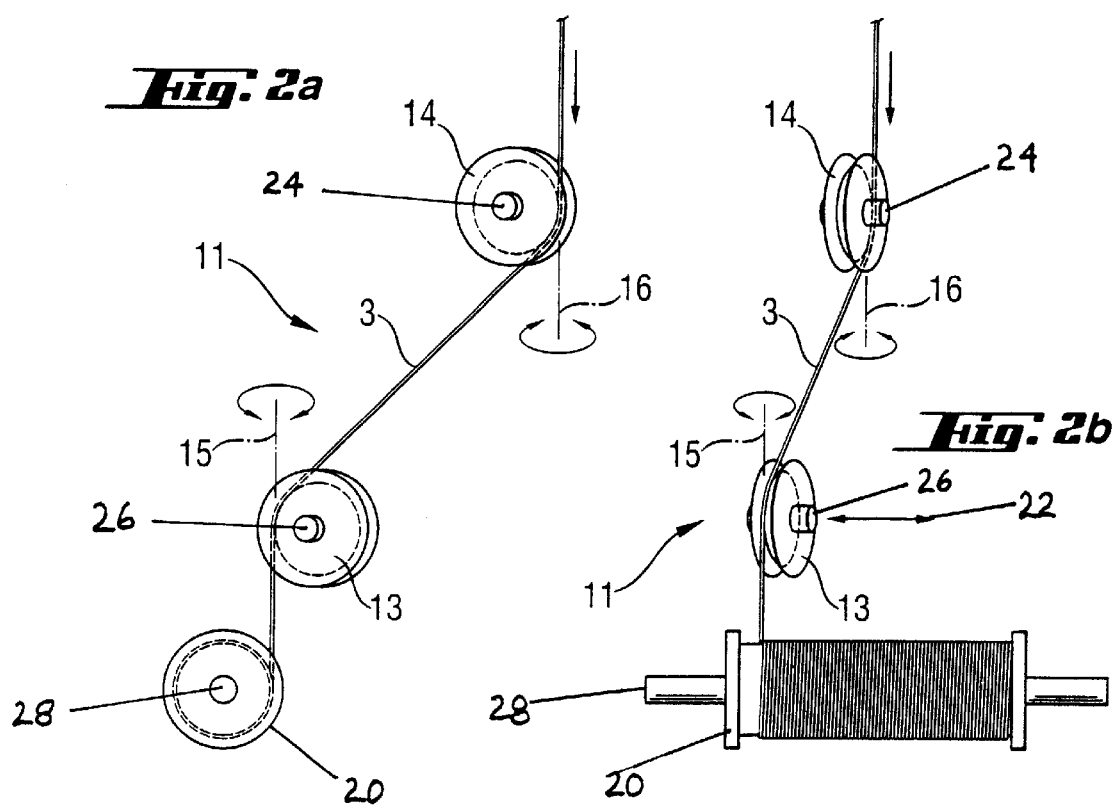
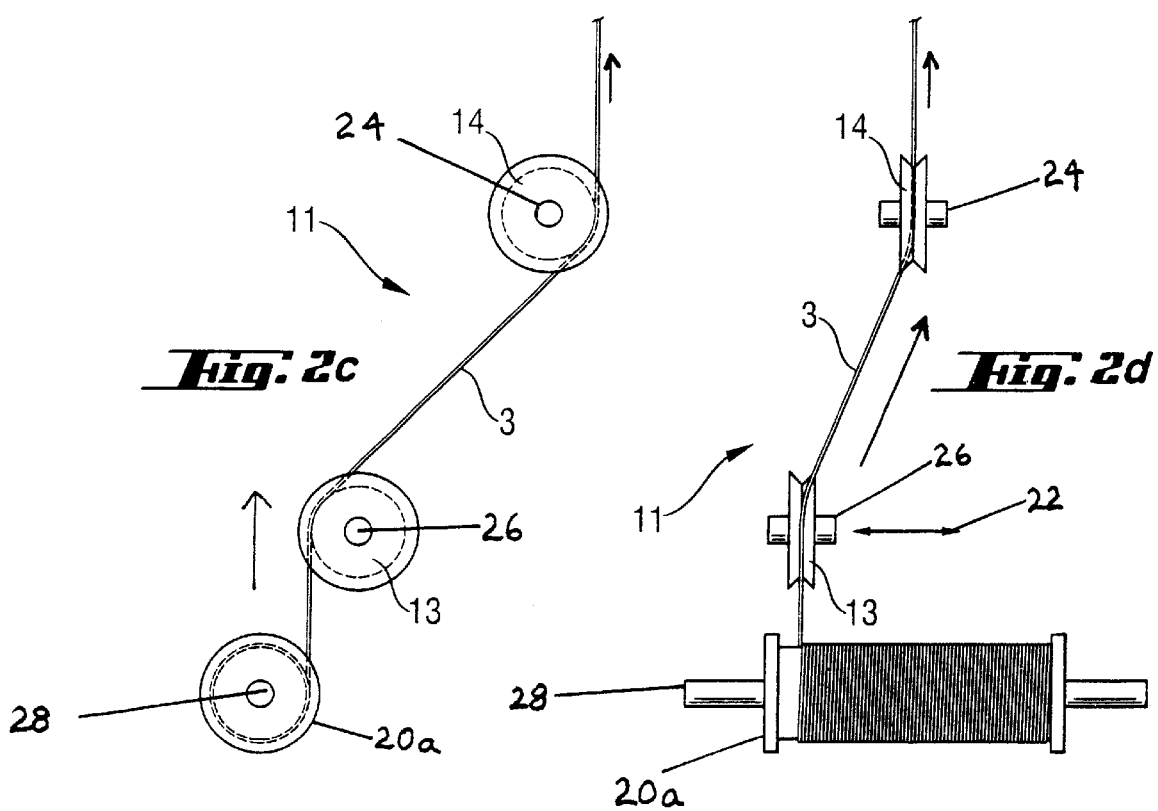

METHOD AND DEVICE FOR CUTTING A MULTIPLICITY OF DISKS FROM A HARD BRITTLE WORKPIECE

BACKGROUND OF THE INVENTION

1. Field of the Invention

The present invention relates to a method for cutting a multiplicity of disks from a hard brittle workpiece with the aid of a wire saw. The invention also relates to a wire saw which is suitable for carrying out the method. The invention can be used for all hard brittle materials which are to be sawn into wafers, in particular semiconductor material and ceramics. The invention is particularly suitable for cutting off silicon wafers from a single crystal.

2. The Prior Art

Currently, wire saws which operate with a cutting slurry are predominantly used to produce silicon wafers. In these saws, a steel wire with a length of 50 km to 500 km runs helically over wire-guidance rollers and forms a wire web. Generally, a hard material, for example SiC, in a carrier liquid is used as the cutting lapping medium. It is supplied during the cutting operation and is transported freely into the cutting gap by the movement of the wire. In the process, depending on the cutting length and feed path, several hundred wafers are produced simultaneously in a process which lasts several hours. The sawing wire is either moved in the same direction throughout the entire cutting sequence or is moved back and forth (oscillating wire movement). When moving with a directional change, the forward movement is always longer than the backward movement, with the result that as yet unused sawing wire is also constantly being deployed.

The prior art also encompasses single-wire cutting methods in which the sawing wire is covered with bonded abrasive grain and makes only a single incision into the workpiece. It is possible to differentiate between methods in which a wire loop (endless, constant direction of movement) is used and methods in which an endless sawing wire with oscillating wire movement is used. In the case of the oscillating methods, the sawing wire is unwound from a spool, runs to the workpiece and is wound back onto a receiving spool.

SUMMARY OF THE INVENTION

The present invention relates to a method for cutting a multiplicity of disks from a hard brittle workpiece, by moving the workpiece at a defined feed rate through a wire web of a wire saw, wherein the wire web is formed by a sawing wire which moves in a reciprocating manner and is covered with bonded abrasive grain, and a cooling liquid is provided beneath the wire web, in which liquid the sawing wire of the wire web is immersed when cutting off the disks.

The invention makes it possible to cut off wafers without the expensive operations of supplying and disposing of slurry, and the associated high outlay on equipment, together with the ecological problems which have to be taken into consideration. It utilizes the fact that bonded grains or particles have an abrasive action and therefore cut more efficiently than the hard materials in a slurry, which have a lapping action. The invention makes it possible in particular to achieve higher cutting capacities, shorter process times and improved cutting qualities. In addition, the method of the invention does not exhibit the drawbacks of known single-wire cutting methods, which are uneconomical, since it is only possible to produce one disk each time. An additional drawback of the prior art is that the cutting times are very long compared to competitor methods for making single cuts, such as annular sawing.

BRIEF DESCRIPTION OF THE DRAWINGS

Other objects and features of the present invention will become apparent from the following detailed description considered in connection with the accompanying drawings which discloses several embodiments of the present invention. It should be understood, however, that the drawings are designed for the purpose of illustration only and not as a definition of the limits of the invention.

In the drawings, wherein similar reference characters denote similar elements throughout the several views:

FIG. 2a shows a front view of a displacer means and receiving spool of the wire saw of the invention;

FIG. 2b shows a side view of the structure shown in FIG. 2a;

FIG. 2c shows a front view of a second embodiment of the displacer means and dispensing spool of the invention; and FIG. 2d shows a side view of the structure shown in FIG. 2c.

DETAILED DESCRIPTION OF PREFERRED EMBODIMENTS

Figure 1:
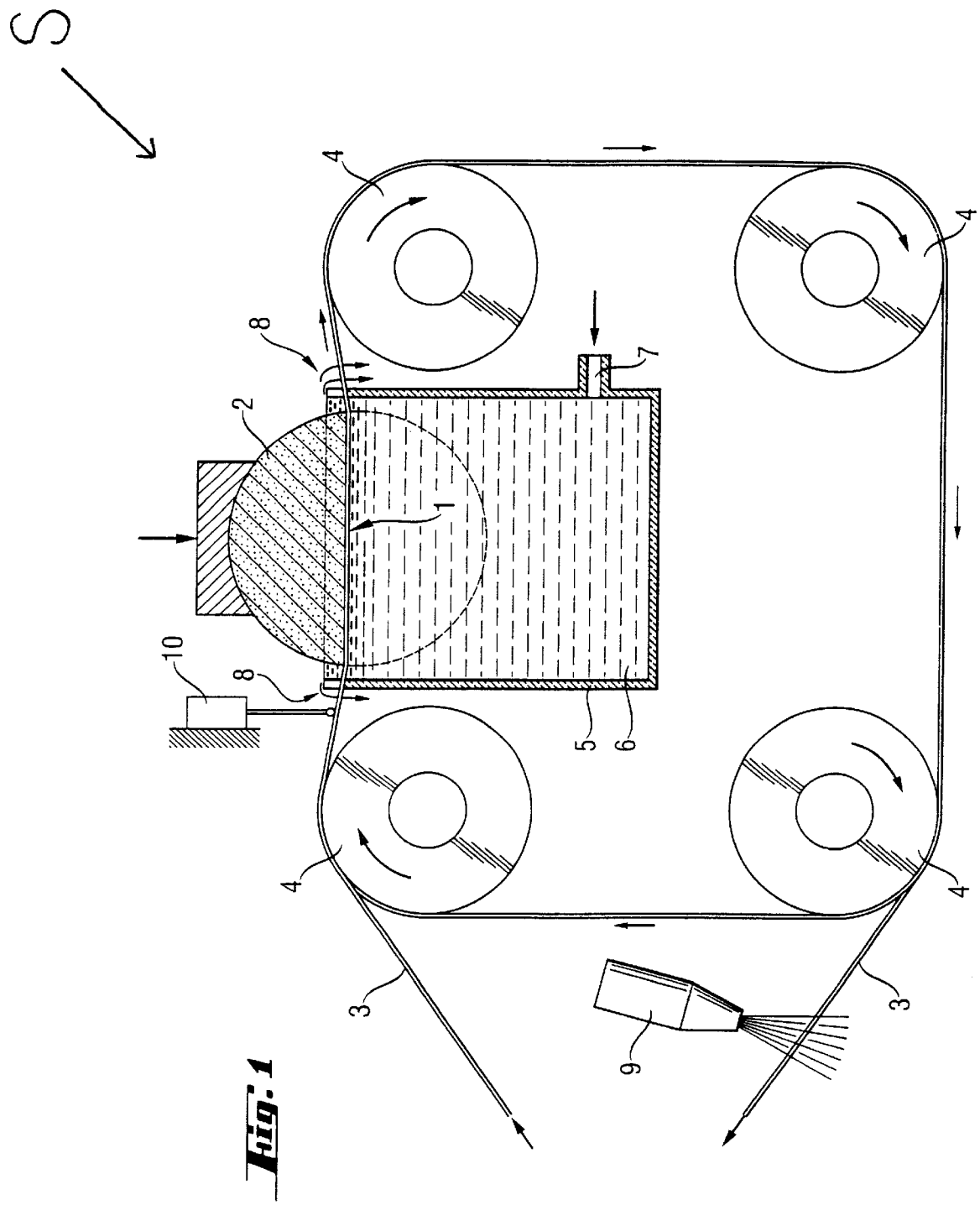
FIG. 1 diagrammatically shows a wire saw which is suitable for carrying out the method according to the invention.

Turning now in detail to the drawings, the wire saw S shown in FIG. 1 has a wire web 1, by means of which the workpiece 2 is moved at a defined feed rate. The wire web is formed by a sawing wire 3 which is covered with bonded abrasive particles and is wound around wire-guidance rollers 4. The wire saw furthermore comprises a reservoir 5 which is filled with cooling liquid 6. The reservoir is arranged beneath the wire web 1, in such a manner that the sawing wire of the wire web, which cuts into the workpiece 2, is immersed in the cooling liquid 6 when cutting off disks. The cooling liquid, preferably water, is expediently circulated and filtered if necessary. The figure only diagrammatically depicts the feed port 7 and the discharge port 8 of the cooling circuit.

An endless sawing wire is used which is coated with an abrasive, preferably with diamond and which executes a reciprocating movement over guide rollers. The length of the sawing wire must be dimensioned in such a way that it is possible to provide a wire web of a desired length and with sufficient sawing wire available for the cutting movement. Typically, the length of sawing wire required approximately corresponds to the length which is required to form the wire web, plus an additional at least 50 m. Further preferred parameters are a thickness of the wire which is covered with abrasive grain of 180 to 230 µm in total thickness, a wire stress of 10 to 40 N, a wire speed of from 8 to 20 m/s, a wire acceleration of 0.5 to 5 m/s$^2$, a wire oscillation of greater than 100 m, and a spool and wire-guidance roller diameter of greater than 100 mm.

The reservoir 6 is preferably constructed as an overflow basin, particularly preferably as a plastic tray. In this case, the sawing wire can cut into the top edge of the basin. The wire saw may also be constructed in such a way that parts of the cutting head which hold the wire-guidance rollers form the lateral boundaries of the overflow basin.

When the workpiece is moving in the feed direction, the sawing wire is pressed beneath the surface of the cooling liquid in the area of the wire web. As a result, the cutting of the wafers takes place entirely in the cooling liquid, so that optimum cooling of the cutting gap is ensured. Immersing the sawing wire in the cooling liquid is useful not only for cooling purposes, but it also assists with lubrication and the removal of abraded chip material.

In a further embodiment, it is possible to use a unit 9 for cleaning the sawing wire 3, in order to maintain the space between the abrasive grain. The wire cleaning also serves to avoid entrapment of sludge, such as abraded silicon, into the winding area, with the result that the wear of the guide rollers and spools can be minimized. The unit 9 is used to feed a cleaning medium, for example pressurized air or water, to the sawing wire. It is particularly preferable for the unit 9 to comprise at least one megasonic nozzle which excites high-frequency vibrations in the cleaning medium used.

It is particularly advantageous to adjust and monitor the cutting force in the feed direction, in order to ensure an optimum abrasive grain loading while the disks are being cut off. The cutting force results from the selected wire stress, the feed rate and the dynamic resilience of the wire web. The resilience of the wire web results, proportionally to the feed force, in bending of the sawing wire which can be measured. The measured bending is preferably used to control the feed rate, the feed rate being reduced when the bending increases, and vice versa. Therefore, the wire saw is preferably also equipped with a device 10 for measuring deflection of the sawing wire when the disks are being cut off and for controlling the feed rate as a function of the measured deflection.

The sawing wire should preferably be wound onto a receiving spool 20, and/or the sawing wire should be unwound from a delivery spool, by means of a displacer unit which ensures that the sawing wire does not become crossed and is aligned with each guide-roller groove. This is because an obliquely guided wire, due to the frequent reversal of movement, breaks at the same wire position.

FIGS. 2*a,b* show two different views of such a displacer unit 11 (FIG. 2*a* front view, FIG. 2*b* side view). It comprises two guide rollers 13 and 14, the first or the lower guide roller 13 axially displacing the sawing wire onto a receiving spool 20. The double arrow 22 is intended to indicate this axial movement. A particular feature of the guide rollers is that they can be rotated about the axes 15 and 16. Depending on the displaced position, the rotating mechanism inclines the axis of the guide rollers in such a way that the sawing wire is made to run perpendicular to the axis of rotation 24 of guide roller 14 and the axis of rotation 26 of the guide roller 13. The upper guide roller is the second guide roller 14. Spool 20 has axis of rotation 28.

For comparison purposes, the top part of FIGS. 2*c* and 2*d* shows a corresponding displacer unit 11 which does not have this feature of axes 15 and 16. Thus there is the result that the sawing wire 3, depending on the displaced position, runs at an angle from or onto the guide rollers 13 and 14. If the axes of guide roller 13 or 14 and spool 20 are arranged at an angle of 90°, however, it is also possible to use a displacer unit 11 designed in this way, in which case the direction of movement 22 (double arrow) is then at 90° to the axis of rotation.

FIGS. 2*c* and 2*d* show a displacer means 11 for unwinding the sawing wire 3 from a delivery spool 20*a*, which displacer means comprises two guide rollers 13 and 14, with a first guide roller 13, which takes the sawing wire from the spool, and with a second guide roller 14, which receives the sawing wire from said first guide roller. The two guide rollers can alternatively have means for rotating about an axis 15 or 16 (FIGS. 2*a* and 2*b*), which is perpendicular to an axis of rotation 26 or 24 of each of the guide rollers 13 and 14.

Silicon wafers produced according to the invention can be processed further by grinding (on one side, both sides sequentially or both sides simultaneously), edge rounding, etching and double-side polishing (in sequence or simultaneously). When using diamond-covered sawing wires with a relatively fine grain size (20 μm or less), it is possible to produce particularly smooth surfaces with few defects. Thus it may be possible to dispense with the grinding and/or etching operation in the sequence mentioned above.

Accordingly, while a few embodiments of the present invention have been shown and described, it is to be understood that many changes and modifications may be made thereunto without departing from the spirit and scope of the invention as defined in the appended claims.

What is claimed is:

1. A method for cutting off a multiplicity of disks from a hard brittle workpiece comprising, moving the hard brittle workpiece at a feed rate through a wire web of a wire saw;

forming wire web by moving a sawing wire in a reciprocating manner and said sawing wire being covered with bonded abrasive grain;

providing a cooling liquid beneath the wire web;

immersing the sawing wire of the wire web in said cooling liquid when cutting off the disks;

said workpiece deflecting said sawing wire out of an at-rest position when the disks are being cut off;

measuring a deflection of the sawing wire; and controlling the feed rate of the workpiece as a function of a measured deflection of the sawing wire.

2. The method as claimed in claim 1, comprising winding the sawing wire onto a receiving spool via two guide rollers; and a first of the two guide rollers supplying the sawing wire onto the spool, said first guide roller and a second guide roller which supplies the sawing wire to the first guide roller being rotatable so that each can rotate perpendicular to each's axis of rotation, so that the sawing wire between the spool and the two guide rollers always moves perpendicular to an axis of rotation of the spool.

3. The method as claimed in claim 1, comprising unwinding the sawing wire from a delivery spool via two guide rollers; and the first of the two guide rollers receiving the sawing wire from the spool, said first guide roller and a second guide roller which receives the sawing wire from said first guide roller being rotatable so that each can rotate perpendicular to each's axis of rotation, so that the sawing wire between the spool and the two guide rollers always moves perpendicular to an axis of rotation of the spool.

4. Wire saw for cutting off a multiplicity of disks from a hard brittle workpiece, comprising a wire web, through which the workpiece is moved at a feed rate;

said wire saw having a reciprocating sawing wire which is covered with bonded abrasive grain;

wire-guidance rollers around which said sawing wire is wound, so that said sawing wire forms the wire web;

said wire saw having a reservoir which is filled with cooling liquid and said reservoir is arranged beneath the wire web, in such a manner that the sawing wire of the wire web is immersed in the cooling liquid when the disks are being cut off; and a device for measuring a deflection of the sawing wire when the disks are being cut off and for controlling the feed rate of the workpiece as a function of the measured deflection.

5. The wire saw as claimed in claim 4, comprising a displacer means for winding the sawing wire onto a receiving spool, said displacer means comprises two guide rollers with a first guide roller which axially displaces the sawing wire onto the spool, and with a second guide roller which delivers the sawing wire to said first guide roller, the two guide rollers having means for rotating each about an axis which is perpendicular to an axis of rotation of each of the guide rollers.

6. The wire saw as claimed in claim 4, comprising a displacer means for unwinding the sawing wire from a delivery spool, said displacer means comprises two guide rollers with a first guide roller which takes the sawing wire from the spool, and with a second guide roller which receives the sawing wire from said first guide roller, the two guide rollers having means for rotating about an axis which is perpendicular to an axis of rotation of each of the guide rollers.

7. A method for cutting off a multiplicity of disks from a hard brittle workpiece comprising, moving the hard brittle workpiece at a feed rate through a wire web of a wire saw;

forming the wire web by moving a sawing wire in a reciprocating manner and said sawing wire being covered with bonded abrasive grain;

providing a cooling liquid beneath the wire web;

immersing the sawing wire of the wire web in said cooling liquid when cutting off the disks;

cleaning the sawing wire with a cleaning medium; and applying megasonic vibrations to said cleaning medium by using at least one megasonic nozzle.

8. Wire saw for cutting off a multiplicity of disks from a hard brittle workpiece, comprising a wire web, through which the workpiece is moved at a feed rate;

said wire saw having a reciprocating sawing wire which is covered with bonded abrasive grain;

wire-guidance rollers around which said sawing wire is wound, so that said sawing wire forms the wire web;

said wire saw having a reservoir which is filled with cooling liquid and said reservoir is arranged beneath the wire web, in such a manner that the sawing wire of the wire web is immersed in the cooling liquid when the disks are being cut off; and means for cleaning the sawing wire which comprises at least one megasonic nozzle.

* * * * *